June 21, 1927.
B. FRAZIER
CONCEALED STAIRWAY
Filed March 4, 1927
1,633,321
2 Sheets-Sheet 1
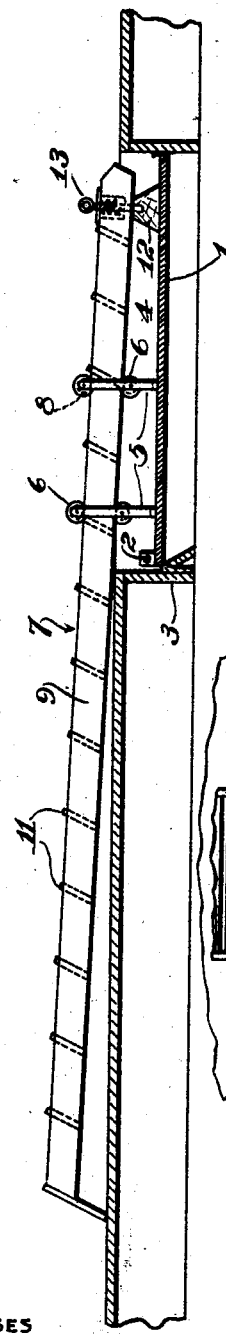
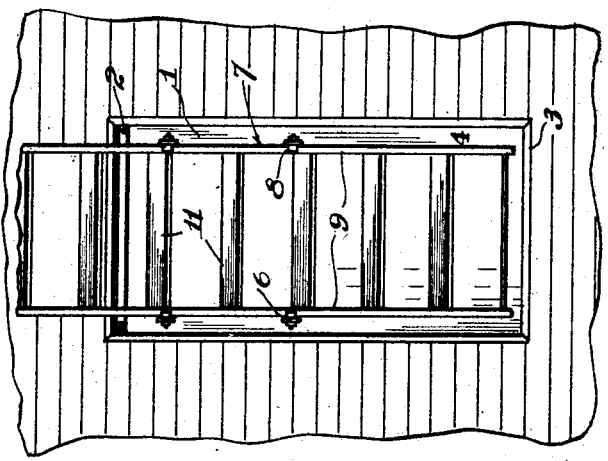
WITNESSES
A. B. Wallace
William B. Jaspert
INVENTOR
Bert Frazier
by Winter Brown & Critchlow
his attorneys.

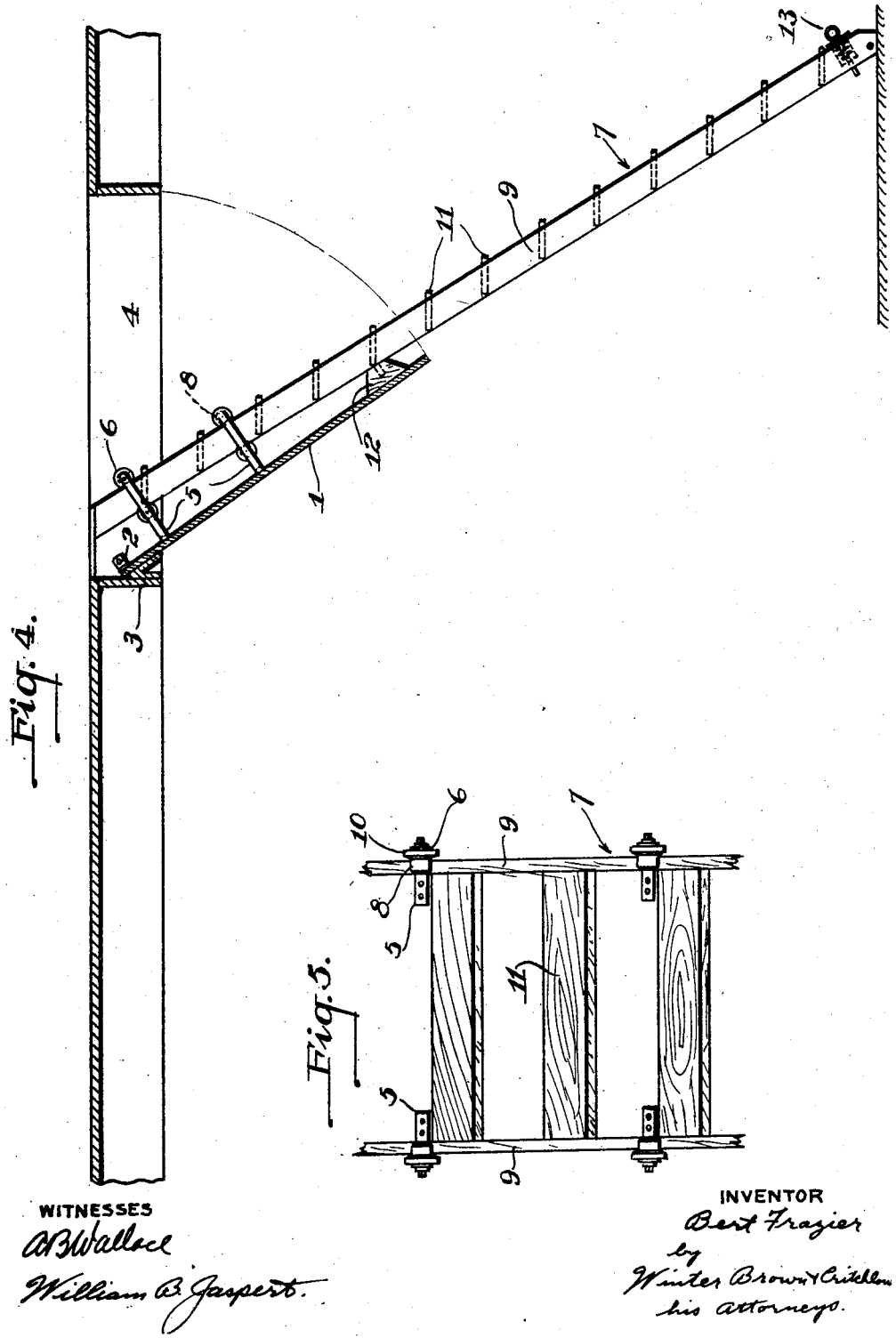

Patented June 21, 1927.

1,633,321

UNITED STATES PATENT OFFICE.

BERT FRAZIER, OF PITTSBURGH, PENNSYLVANIA.

CONCEALED STAIRWAY.

Application filed March 4, 1927. Serial No. 172,617.

This invention relates to improvements in concealed stairways, more particularly to movable stairways cooperating with trap doors whereby they are adapted to be moved out of sight when not in use.

Various forms of concealed stairways have been heretofore proposed having the common object of providing ingress and egress to and from garrets or lofts utilized for storage purposes or the like. Another object in the construction of the movable stairway is to provide for maintaining the stairway in an idle space of the building when not in use, and various means have been suggested for providing for ease of manipulation to facilitate moving the stairway into and out of its working position.

In accordance with the present invention it is proposed to provide a concealed stairway which shall be adapted to cooperate with a trap door in a manner to make it readily available for use when desired and to provide for its disposition in an idle portion of a building when not in use.

It is among the objects of the invention to provide a concealed stairway which shall be adapted to cooperate with a trap door in a manner to effect a balance of the stairway and trap door when the stairway has been partially displaced to aid in the closing of the trap door, and for maintaining the latter in its closed position.

It is another object of the invention to provide a movable stairway and trap door which shall be adapted to cooperate in a manner to render the trap door operative in its closing movement, by virtue of the weight and disposition of the stairway.

Still another object of the invention is to provide a movable stairway and trap door which shall be of simple, compact and durable mechanical construction, which shall comprise a minimum number of operating parts and which shall be so designed as to be adapted for use, by properly proportioning the stairway and trap door, in accordance with the particular service conditions met with.

In the accompanying drawings constituting a part hereof and in which like reference characters designate like parts, Fig. 1 is a longitudinal sectional view of a floor illustrating a movable stairway in side elevation embodying the principles of this invention; Fig. 2 a partial plan view of the stairway and a cooperating trap door; Fig. 3 an end elevational view thereof; Fig. 4 a side elevation partially in section illustrating the stairway and trap door in their open position; and Fig. 5 a bottom plan view of a portion of the movable stairway illustrating the roller mechanism on which it is supported.

Referring to the figures of the drawing the structure therein illustrated comprises a trap door 1 hinged at 2 to the jamb 3 of a trap or opening generally designated at 4. The trap door 1 is adapted for pivotal movement through an angle the extremities of which are illustrated in Figs. 1 and 4, the door being in its closed position which constitutes one limit of its movement in Fig. 1 and in its open position which is the other limit of angular movement in Fig. 4.

Mounted on the trap door 1 are a plurality of vertical braces or brackets 5 having rollers 6 journaled thereon to constitute a runway for a stairway 7. The rollers 6 are provided with plane-engaging faces 8 which are spaced a suitable distance apart to intimately engage side members 9 of the stairway. Flanges 10 of the rollers limit side movement of the stairway as shown in Fig. 3. The stairway 7 is provided with treads 11 which are secured between the side members 9 in a manner to prevent interference with the roller 6 in the raising and lowering movement thereof. Mounted at one end of the trap door 1 is a block 12 having an opening therein which is adapted to receive a pin 13 which functions to secure the stairway against movement relative to the trap door after it has been raised to the position where the pin 13 registers with the opening in the block 12. When the stairway is locked to the trap door in the manner described it will be held against movement thereon and the trap door 1 may be swung on its pivot to the position shown in Fig. 1.

As shown in Fig. 1 the over-all length of the ladder is greater than twice the length of the trap door, this being for the purpose of providing a sufficient overhang when the ladder is raised to its uppermost position, which is the position where it is locked to the trap door by the pin 13 to produce an overhang or counterbalancing effect that is sufficient to overcome the weight of the trap door and raise the ladder to its closed position.

The correct or necessary position to produce an overbalance of the raised portion of the stairway sufficient to overcome the weight of the door is not alone dependent upon the relative dimensions of the trap door and stairway but is also dependent upon the materials chosen in the construction of the stairway and door. For example it is of course desirable to choose light weight material in the manufacture of the stairway on account of the fact that it must be raised and lowered by hand. On this account pine wood is commonly employed and most suited for the construction of the stairway. It is equally desirable to make the trap door of light weight material and accordingly the same material is utilized for the trap door as is employed in the manufacture of the stairway.

In the stairway illustrated there are fourteen treads, the number of treads depending upon the distance from the floor to the ceiling in which the ladder is to be spaced, and also upon the available space in which to set up the ladder. The riser is usually limited to a length of less than nine inches between the treads and accordingly the length of the stairway divided by the distance between the treads will determine the number of treads in the stairway.

It has been found that certain proportions between the number of treads on one side of the trap door hinge and the number on the other side of the hinge if maintained, provided the stairway and trap door are made of the same material, will provide a sufficient overhang to properly counterbalance the trap door. In the illustration shown in Fig. 1 the length of the trap door is equal to approximately the distance between five and a half of the treads and the portion of the stairway overhanging is equal to a distance of about eight and a half treads, and if this ratio of five and a half to eight and a half for the length of the trap door in proportion to the total length of the stairway is maintained there will be sufficient overhang of stairway to counterbalance the weight of the trap door and the portion of the stairway equal to the length of the trap door to permit raising the latter to its closed position with very little effort, and similarly the trap door may be lowered to the position shown in Fig. 4 with just sufficient force applied to start it in motion. When the trap door and stairway is in the position shown in Fig. 1 the overhang beyond the ends of the trap door will maintain the door in its closed position and in the position shown in Fig. 4 the trap door will of course remain open to permit releasing the pin from the block 12 for the subsequent lowering of the stairway.

The principle of employing movable stairways in cooperative relation with hinged trap doors is old in the art, and the present invention is directed to the particular construction of trap door and stairway in the relative proportions mentioned for the purpose of effecting a counterbalance or overhang without the use of counterweights and other operating mechanism as heretofore proposed.

It is evident from the foregoing description of the invention that movable stairways made in accordance therewith provide a simple, compact, and relatively inexpensive construction which is applicable for use in relatively small space and which is relatively inexpensive to manufacture.

Although a specific embodiment of the invention has been herein illustrated and described it will be obvious to those skilled in the art that various modifications may be made in the details of construction and in the arrangements of the several cooperating parts without departing from the principles herein set forth.

I claim:

1. The combination, with a hinged trap door, of a stairway slidably supported thereon in such manner that it may be pushed up into the space above the trap door or slid down to a floor below, characterized by having the upwardly extending overhanging end of the stairway, above the hinged end of the trap door, materially longer than the trap door in the raised position of the stairway, and locking means for retaining said stairway in fixed relation to the trap door in said raised position, the weight of said overhanging end being itself capable, in the absence of any other counterbalancing means, of at least completing the closing operation of said trap door by virtue of the weight of the stairway in excess of that of the trap door and retaining the same in closed position.

2. An un-counterpoised, springless, concealable stairway comprising a trap door hinged at one end, guiding means mounted thereon, a stairway slidably mounted in said guiding means in such manner that it may be moved from a lowered, operative position to a raised, inoperative position wherein it is solely supported by said trap door and is movable, as a fixed unit therewith, about the hinge of the trap door as the latter is being closed, and means for temporarily holding together the trap door and stairway as a unit when the stairway is in its raised position, the stairway being disposed above the hinge, in its raised, inoperative position, and being so nicely balanced against the weight of the trap door that the shifting of the center of gravity of the unit composed of the trap door and stairway, during the closing of the trap door, with the stairway in its raised, inoperative position, is sufficient to cause the trap door to remain in either extreme position of its movement.

In testimony whereof, I sign my name.

BERT FRAZIER.